United States Patent [19]

Mori

[11] 4,376,393

[45] Mar. 15, 1983

[54] CONNECTING ROD OF RADIAL PISTON MOTOR AND METHOD OF PRODUCING SAME

[75] Inventor: Sanae Mori, Nagoya, Japan

[73] Assignee: Daido Metal Company, Ltd., Nagoya, Japan

[21] Appl. No.: 165,328

[22] Filed: Jul. 2, 1980

[30] Foreign Application Priority Data

Dec. 28, 1979 [JP] Japan .......................... 54-181683[U]
Dec. 28, 1979 [JP] Japan .......................... 54-181684[U]

[51] Int. Cl.³ ........................... G05G 1/00; F16C 9/04
[52] U.S. Cl. .............................. 74/579 R; 29/156.5 A; 74/580; 403/271
[58] Field of Search ............................. 74/580, 579 R; 29/156.5 A; 308/237 R; 403/271, 267

[56] References Cited

U.S. PATENT DOCUMENTS 3,101,402  8/1963  Gondek ......................... 29/156.5 A 3,736,639  6/1973  Leffers .......................... 29/156.5 A

FOREIGN PATENT DOCUMENTS 2408364  5/1979  France .......................... 29/156.5 A Primary Examiner—Kenneth Dorner
Attorney, Agent, or Firm—Karl W. Flocks; Sheridan Neimark

[57] ABSTRACT

A connecting rod of a radial piston motor comprising a spherical portion, a rod portion and a pad and a method of producing same, wherein the pad is formed separately from the spherical portion and the rod portion beforehand, and interfitting portions are formed in the rod portion and the pad. The rod portion and the pad are connected to each other through the interfitting portions to form therebetween a joint which is welded, to produce the desired connecting rod of a radial piston motor. The provision of the interfitting portions enables the rod portion and the pad to be positioned with a high degree of precision.

2 Claims, 6 Drawing Figures

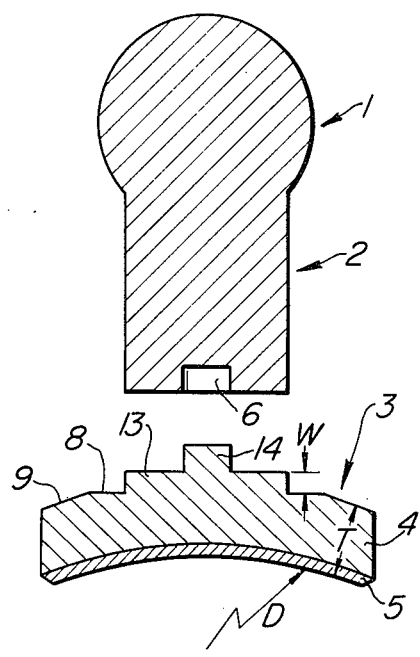

CONNECTING ROD OF RADIAL PISTON MOTOR AND METHOD OF PRODUCING SAME

BACKGROUND OF THE INVENTION

This invention relates to a connecting rod of a radial piston motor comprising a spherical portion, a rod portion and a pad, and to a method of producing same.

In producing connecting rods of radial piston motors of the prior art, difficulties have been experienced in positively securing the rod portion to the pad in a predetermined position of the connecting rod to be produced. Also, connecting rods of the prior art have had the disadvantage that the rod portion and the pad undergo deformation after they are joined to each other, so that it has been impossible to obtain connecting rods of radial piston motors which have dimensional stability.

SUMMARY OF THE INVENTION

An object of the present invention is to provide a connecting rod of a radial piston motor and a method of producing same, wherein its rod portion and its pad are formed with interfitting portions and the rod portion and the pad are joined together by welding after having been connected to each other through the interfitting portions.

Another object of the present invention is to provide a connecting rod of a radial piston motor and a method of producing same, wherein its rod portion and its pad can be positively secured to each other in a predetermined position of the connecting rod with a high degree of precision.

Still another object is to provide a connecting rod of a radial piston motor and a method of producing same, wherein no deformation or deterioration occurs following production, so that the connecting rod has dimensional stability.

Still another object of the present invention is to provide a connecting rod of a radial piston motor and a method of producing same, wherein its pad is provided at its inner sliding surface with a layer of most suitable bearing material.

A further object of this invention is to provide a connecting rod for a radial piston motor and a method of producing same, wherein the connecting rod is very easy to manufacture and quite advantageous both commercially and industrially.

BRIEF DESCRIPTION OF THE DRAWINGS

FIG. 4 is vertical sectional view of the connecting rod of a radial piston motor representing another embodiment of the invention, showing the connecting rod before being assembled;

FIG. 5 is a front view of the connecting rod of the radial piston motor shown in FIG. 4, showing the connecting rod after having been assembled; and FIG. 6 is a perspective view of the connecting rod of the radial piston motor shown in FIG. 2, showing the connecting rod after the rod portion has been joined to the pad by welding.

DETAILED DESCRIPTION OF THE PREFERRED EMBODIMENTS

Figure 1:
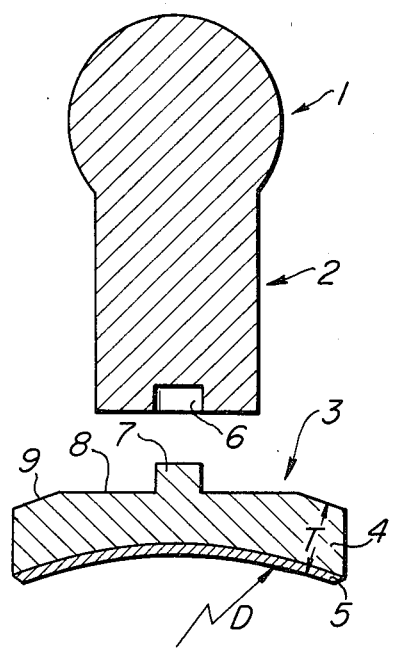
FIG. 1 is a vertical cross sectional view of the connecting rod of a radial piston motor showing one embodiment of the invention of the connecting rod before having been assembled.
Figure 2:
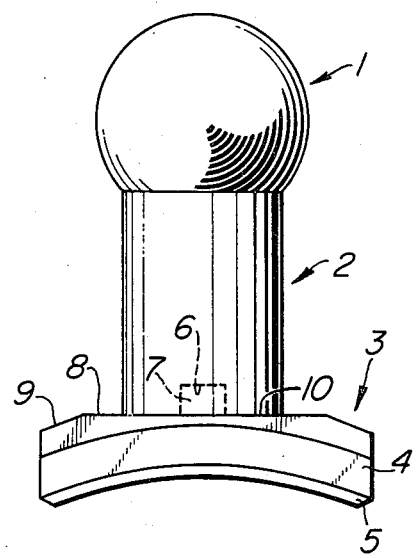
FIG. 2 is a front view of the connecting rod of the radial piston motor shown in FIG. 1, showing the connecting rod after having been assembled.
Figure 3:
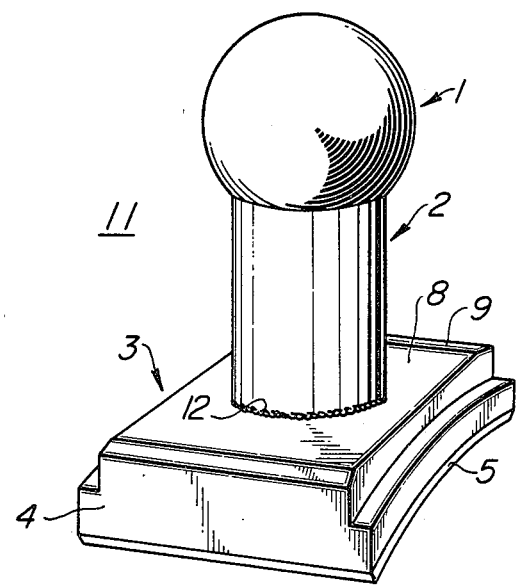
FIG. 3 is a perspective view of the connecting rod of the radial piston motor shown in FIG. 2, showing the connecting rod after the rod portion is joined to the pad by welding.

Preferred embodiments of the invention will now be described by referring to the accompanying drawings. FIGS. 1-3 showing a first embodiment, wherein FIG. 1 is a vertical sectional view of the connecting rod before having been assembled, FIG. 2 is a front view of the connecting rod after having been assembled and FIG. 3 is a perspective view of the connecting rod showing the rod portion joined to the pad by welding.

As shown, the connecting rod comprises a spherical portion 1, a rod portion 2 and a pad 3. The pad 3 includes a metallic backing layer 4 having a bearing alloy layer 5 bonded or clad to its inner surface. The bearing alloy layer 5 may be of any bearing material as desired that can be applied to the inner sliding surface of the pad 3.

The spherical portion 1 is formed integrally with the rod portion 2 which has a recess 6 in a predetermined position on its end opposite to the spherical portion 1 for positioning the rod portion 2 with respect to the pad 3 which has a projection 7 in a predetermined position on its outer surface 9 to be coupled with said recess 6 for positioning the pad 3 with respect to the rod portion 2. A portion 8 is a flat portion on the outer surface 9 surrounding the projection 7. When the projection 7 is inserted in the recess 6 in interfitting relation, a joint 10 (component-to-component interface) is formed on the outer surface 9 of the pad 3. The pad 3 is welded to the rod portion 2 at the joint 10 by electron beam welding to produce a connecting rod 11 of a radial piston motor. 12 is a continuous weld bead formed by electron beam welding. The pad 3 has a thickness T and an inner diameter D. The ratio T/D is preferably 0.07 in the minimum. If the ratio were below 0.07, deformation of the pad 3 after welding wound be great. Thus by setting the ratio T/D at a value over 0.07, it is possible to eliminate the risk that the pad 3 would be deformed after welding.

The provision of the recess 6 in the rod portion 2 and the projection 7 in the pad 3 for connecting them in interfitting relation offers the advantage that the rod portion 2 and the pad 3 can be readily positioned relative to each other with high dimensional accuracy. This facilitates welding to join the rod portion 2 to the pad 3 at the joint 10 formed on the outer surface 9 of the pad 3, with a result that the connecting rod can be produced with good dimensional stability.

In the connecting rod according to the present invention, the spherical portion 1, rod portion 2 and pad 3 are not formed integrally but formed separately with one another, or at least the pad 3 is formed separately from the other parts. This offers the advantage that any suitable bearing alloy (bearing material) as desired may be selected for the bearing alloy layer or overlay 5 depending on the use to which the connecting rod is put. That is, a bearing alloy of optimum quality suitable for the service can be selected as desired.

FIGS. 4-6 show a second embodiment of the invention, FIG. 4 is a vertical sectional view of the connecting rod before assembly, FIG. 5 is a front view of the connecting rod after having been assembled and FIG. 6 is a perspective view of the connecting rod portion joined to the pad by welding.

In the first embodiment shown in FIGS. 1-3, the joint 10 is formed to be flush with the planar or flat portion 8 surrounding the projection 7 on the outer surface 9 of the pad 3. This might degrade the quality of the weld formed at the joint 10 because a part of the energy of welding would be absorbed by the flat portion 8 due to impinging thereon which is not in engagement with the rod portion 2 when the joint 10 is welded.

To eliminate this risk, in the second embodiment, an elevated portion 13 of substantially the same diameter as the rod portion 2 having its top surface spaced apart from the outer surface 9 of the pad 3 by a distance W (preferably over 1 mm) on the pad 3, and a smaller projection 14 for constituting a male-female engagement with the recess 6 of the rod portion 2 is formed on the surface of the elevated portion 13.

By the arrangement described hereinabove, the projection 14 of the pad is inserted in the recess 6 of the rod portion 3 in interfitting relation to form a joint 15 as shown in FIG. 5. Since the joint 15 is not flush with the planar portion 8, there is no risk of the weld being degraded due to the energy of welding being absorbed partly by the planar portion 8 which is not in contact with the rod portion 2, as in the first embodiment. Thus it is possible to obtain a connecting rod of a radial piston motor including a second weld. 17 is a weld produced by electron beam welding.

The ratio of the thickness T of the pad 3 to the inner diameter D thereof, namely, T/D is preferably over 0.07 as is the case with the first embodiment. The second embodiment can achieve the same results as the first embodiment does in facilitating welding and enabling the connecting rod to have dimensional stability because of the feature that the rod portion 2 is connected to the pad 3 by fitting the projection in the recess to facilitate positioning of the rod portion and the pad relative to each other.

In the first and second embodiments shown and described hereinabove, the interfitting portions consist of a projection formed in the rod portion and a recess formed in the pad. However, the invention is not limited to this specific form of interfitting portions, and the rod portion may be formed with a recess and the pad may be formed with a projection without departing from the scope of the invention. Also, the rod portion and the pad may be each formed with not only one interfitting portion but also a plurality of interfitting portions, or the rod portion and the pad may be each formed with one or a plurality of recesses so that they may be interconnected by pins.

The invention is not limited to electron beam welding for joining the rod portion to the pad. Depending on the service to which the connecting rod is subjected, brazing or friction welding may be utilized. The weld formed in the joint may not be continuous but formed in part of the joint.

In both the first and second embodiments, the spherical portion and the rod portion are described as being formed integrally with each other. The invention is not limited to these embodiments and the spherical portion may be formed separately from the rod portion. In this case, the rod portion may be joined directly to the spherical portion by welding or welding may be effected after the two portions are connected together by interfitting.

What is claimed is:

1. In a connecting rod of a radial piston motor having a spherical portion, a rod portion and a curved pad having a thickness T and an internal diameter D,
    the improvement wherein said rod portion (2) is solid and provided at its one end with a recess (6), said pad (3) being a composite bearing constituted by a metallic backing layer and a bearing alloy layer on said backing layer, said backing layer being provided on its surface adjacent to said rod portion with a projection (7,14), said rod portion and said backing layer being joined to each other by electron beam welding at the joint therebetween with said projection fitting in said recess formed in said rod portion; wherein said projection (14) extends from a large projection (13) of diameter substantially equal to the diameter of said rod portion, said electron beam welding at the joint being between said large projection and said rod portion.

2. A connecting rod of a radial piston motor as claimed in Claim 1, wherein the ratio T/D of the thickness T of the composite bearing of said pad portion to the inside diameter D of said bearing alloy layer is 0.07 or greater.

* * * * *